(12) United States Patent
Smith

(10) Patent No.: US 6,748,821 B1
(45) Date of Patent: Jun. 15, 2004

(54) EXTENDABLE HANDLE BAR ASSEMBLY

(76) Inventor: John C. Smith, 137 Tuckerton Rd., Indian Mills, NJ (US) 08088

( * ) Notice: Subject to any disclaimer, the term of this patent is extended or adjusted under 35 U.S.C. 154(b) by 0 days.

(21) Appl. No.: 10/084,073

(22) Filed: Feb. 28, 2002

(51) Int. Cl.$^7$ ............................ B62K 21/16; B62K 21/12
(52) U.S. Cl. .................... 74/551.3; 74/551.1; 74/551.4
(58) Field of Search ............... 74/551.1–551.8; 280/287

(56) References Cited

U.S. PATENT DOCUMENTS

| 575,936 | A | * | 1/1897 | Roso | 74/551.3 |
|---|---|---|---|---|---|
| 604,371 | A | * | 5/1898 | Cook | 74/551.3 |
| 630,069 | A | * | 8/1899 | Paquet | 74/551.1 |
| 1,068,158 | A | * | 7/1913 | Noack | 74/551.3 |
| 3,481,218 | A | | 12/1969 | Yoshikawa | |
| 3,505,901 | A | * | 4/1970 | Stone | 74/551.4 |
| 3,937,629 | A | | 2/1976 | Hamasaka | |
| 4,417,745 | A | * | 11/1983 | Shomo | 280/287 |
| 5,144,859 | A | * | 9/1992 | Malone | 74/551.3 |
| 5,199,322 | A | * | 4/1993 | Wu | 74/551.1 |
| 5,257,552 | A | * | 11/1993 | Boyer et al. | 74/551.1 |
| 5,435,204 | A | * | 7/1995 | Marui | 74/551.4 |
| D412,306 | S | | 7/1999 | Berto | |

FOREIGN PATENT DOCUMENTS

| DE | 4007632 A1 | * | 9/1990 | 74/551.1 |
|---|---|---|---|---|
| JP | 55-19457 | * | 2/1980 | 74/551.1 |

* cited by examiner

Primary Examiner—Vinh T. Luong
(74) Attorney, Agent, or Firm—Norman E. Lehrer

(57) ABSTRACT

An extension for the handle bars of a motorcycle includes an insert with a projection that fits within the handle bars. The handle bars and insert are keyed so as to prevent rotational movement thereof relative to each other. A parallel bar that is clamped to the handle bars retains all of the parts in place. Different size inserts may be placed between the two handle bars in order to extend the width thereof

6 Claims, 3 Drawing Sheets

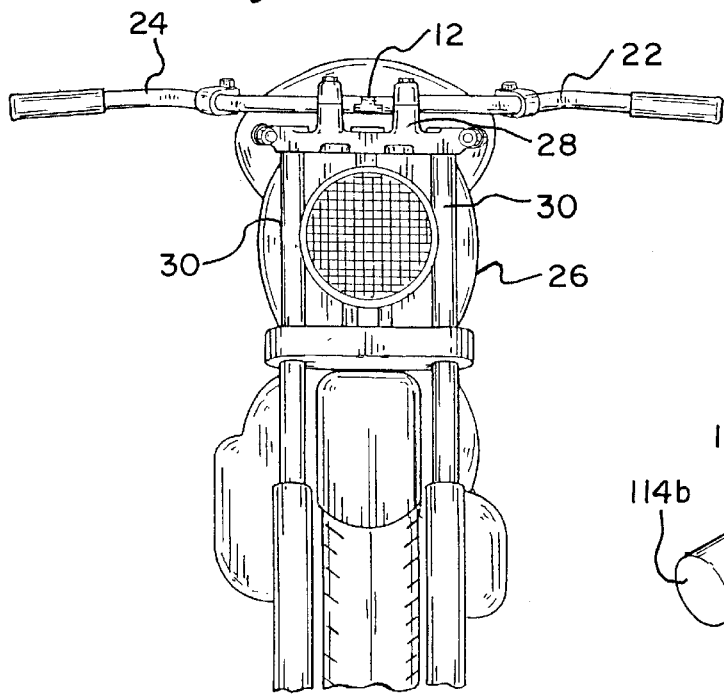
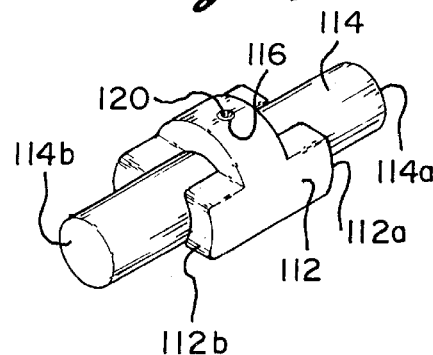
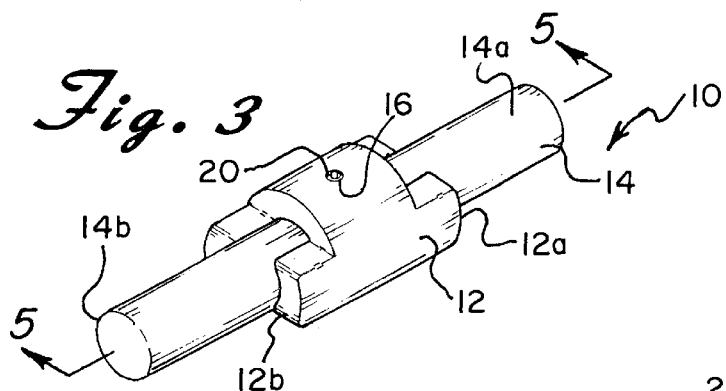
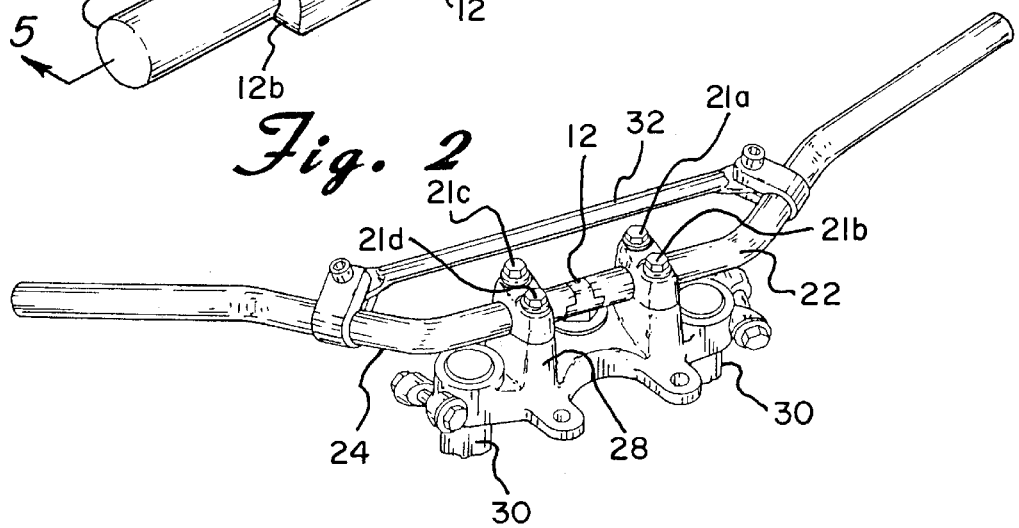

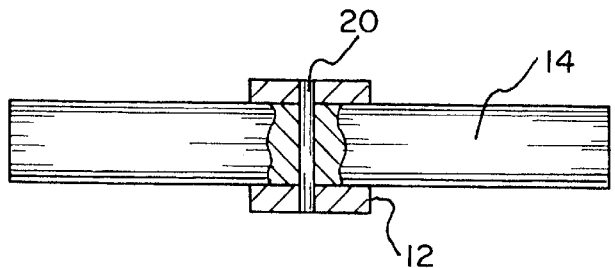
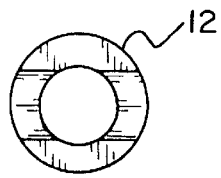
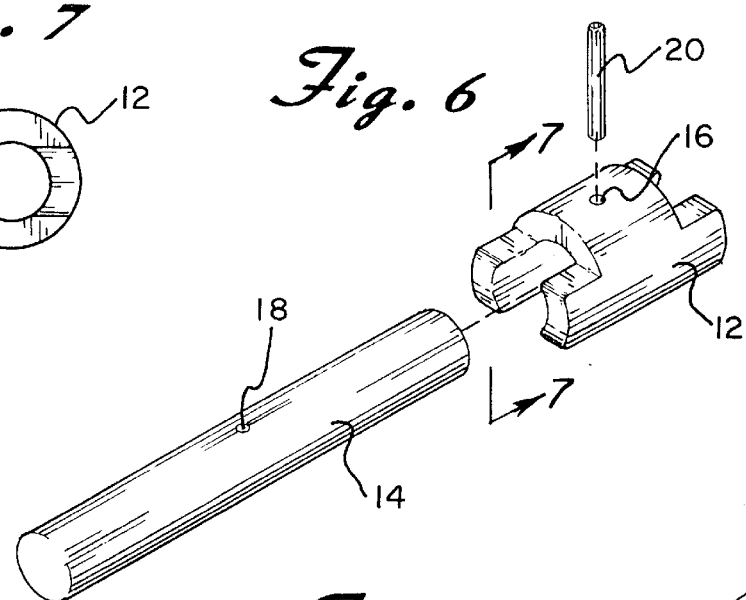
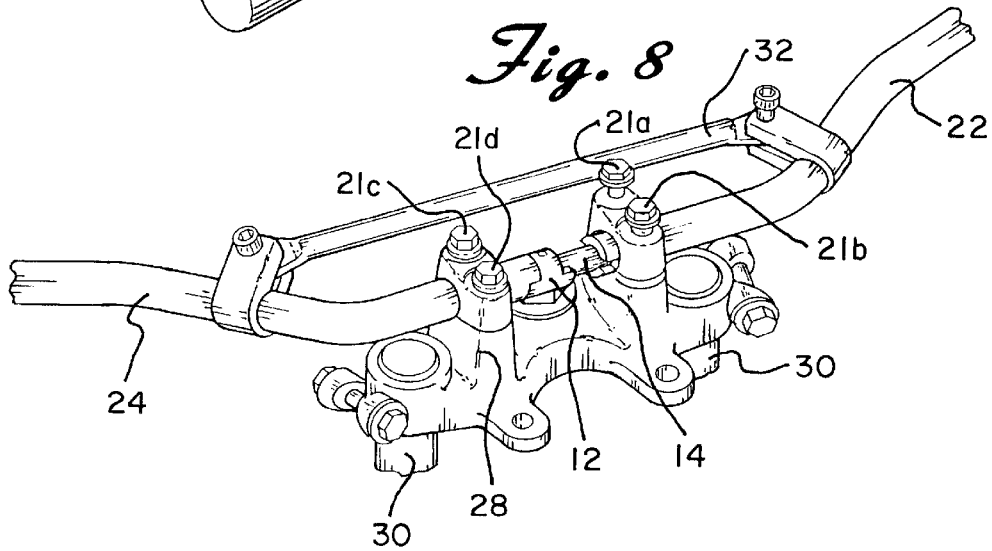

EXTENDABLE HANDLE BAR ASSEMBLY

BACKGROUND OF THE INVENTION

The present invention is directed toward the handle bars for a motorcycle and more particularly, toward an extension which expands the width of the handle bars.

Typically, motorcycle handle bars are a fixed, rigid shape and are not movable. It is, however, at times desirable by the motorcyclist to vary his or her position. For example, city driving varies from highway or rural driving where in the former situation an upright position is desirable and in the latter situation the rider tends to lean back somewhat, away from the handle bars.

In order to accommodate the various positions used by a motorcyclist, various types of handle bars may be used. However, this requires the cyclist to possess more than one type of handle bars which may become expensive. Also, the extra handle bars would have to be stored on the motorcycle in the case of long distance travel. This would take additional storage space which is already rather limited on a motorcycle. Furthermore, owning more than one type of handle bars requires the cyclist to constantly dismantle and mantle the handle bars. This can become a time-consuming and burdensome task.

Several patents have addressed the problem discussed above. For example, U.S. Pat. No. 3,937,629 to Hamasaka discloses an extension for the handle bars of a motorcycle and includes a bracket formed to rotatably encircle the end of the handle bar and an extension member joined to the bracket and projecting outwardly therefrom. Each handle bar has its own bracket and extension. However, because of their location, the extenders may interfere with the rider's use of the handle bars if he or she chooses to use the handle bars rather than the extenders.

A need exists for an extension for the handle bars of a motorcycle which expands the width of the handle bars in a simple, unobtrusive, and compact manner.

SUMMARY OF THE INVENTION

The present is designed to overcome the deficiencies of the prior art discussed above. It is an object of the present invention to provide an extension for the handle bars of a motorcycle which expands the width of the handle bars.

It is another object of the present invention to provide an extension for the handle bars which is easy to install and use.

It is a further object of the present invention to provide an extension for the handle bars of a motorcycle that is compact and unobtrusive.

In accordance with the illustrative embodiments demonstrating features and advantages of the present invention, there is provided an extension for the handlebars of a motorcycle. The extension includes an insert with a projection that fits within the handle bars. The handle bars and insert are keyed so as to prevent rotational movement thereof relative to each other. A parallel bar that is clamped to the handle bars retains all of the parts in place. Different size inserts may be placed between the two handle bars in order to extend the width thereof.

Other objects, features, and advantages of the invention will be readily apparent from the following detailed description of preferred embodiments thereof taken in conjunction with the drawings.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a front elevational view of the extension of the present invention mounted on a motorcycle;

FIG. 2 is a perspective view illustrating the extension of the present invention mounted on a motorcycle;

FIG. 3 is a top perspective view of the extension of the present invention with a projection extending therefrom in a first embodiment;

FIG. 4 is a top perspective view of the extension of the present invention with a projection extending therefrom in a second embodiment;

FIG. 5 is a cross-sectional view taken through line 5—5 of FIG. 3;

FIG. 6 is an exploded view of the extension and projection of the present invention;

FIG. 7 is a cross-sectional view taken through line 7—7 of FIG. 6;

FIG. 8 illustrates the extension of the present invention being installed on the handle bars of a motorcycle;

DETAILED DESCRIPTION OF THE PREFERRED EMBODIMENTS

Figure 9:
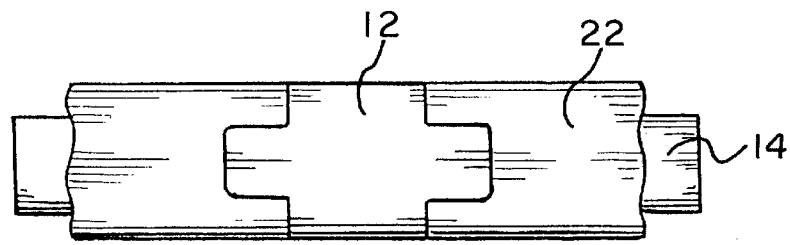
FIG. 9 is a front elevational view of the insert of the present invention connected to the handle bars of a motorcycle with portions broken away.

Referring now to the drawings in detail wherein like reference numerals have been used throughout the various figures to designate like elements, there is shown in FIG. 3 an extendable handle bar assembly for a motorcycle constructed in accordance with the principles of the present invention and designated generally as 10.

In the preferred embodiment, the extension essentially includes a generally cylindrically shaped tubular member or first insert 12 having a right end 12a and a left end 12b and a generally cylindrically shaped rod member or projection 14 with an outer diameter smaller than the inner diameter of the tubular member 12. The rod member 14 fits within the tubular member 12 and has a right end 14a and a left end 14b wherein the ends 14a and 14b extend outwardly from the right and left ends 12a and 12b of the tubular member 12, respectively. (See FIG. 3.)

The body of the insert 12 and of the projection 14 have apertures 16 and 18 formed therein, respectively. The apertures 16 and 18 align with each other when the projection 14 is placed within the insert 12. (See FIG. 6.) A pin 20 is inserted into the apertures 16 and 18 and secures the insert 12 and projection 14 together. (See FIGS. 5 and 6.) Alternatively, the insert 12 and rod member 14 may be formed as one piece such as by molding or machining or the like.

The handle bars are of standard hollow, tubular construction and are bolted to the motorcycle 26 in a standard manner. That is, left and right handle bar portions 22 and 24, having left and right proximal and distal ends respectively, are held in place adjacent their proximal ends by triple clamp 28 which is bolted to the arms of the fork 30 of the motorcycle 26. In order to use the extension, the handle bar portions 22 and 24 of the motorcycle 26 are separated from each other at the midpoint by loosening bolts 21a, 21b, 21c, and 21d. The insert 12 with the projection 14 secured therein via pin 20 fits between the handle bar portions 22 and 24 so that the ends 14a and 14b of the projection 14 extend within the handle bar portions 22 and 24, respectively. (See FIG. 8.) The handle bar portions 22 and 24 are then engaged with the insert 12. Once the inert 12 is in place, the bolts 21a, 21b, 21c, and 21d may be tightened, thereby securing the handle bar portions 22 and 24 in place with the insert 12 therebetween.

Figure 10:
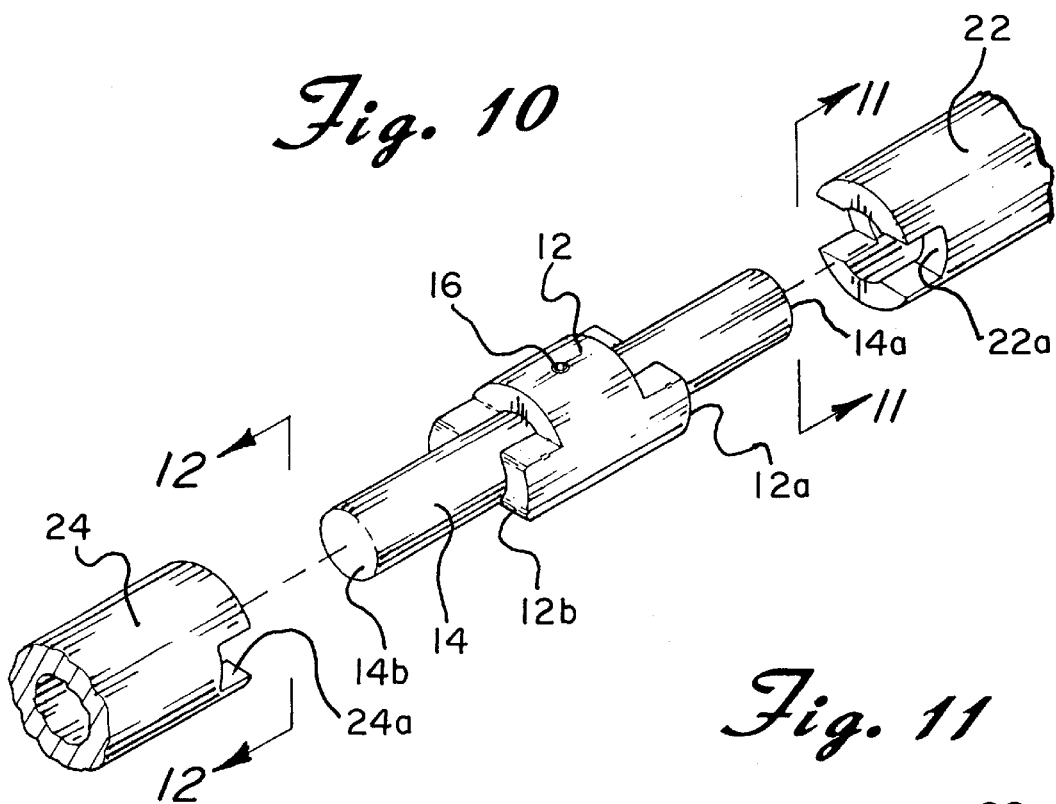
FIG. 10 is an exploded view of extension and the projections extending therefrom.
Figure 11:
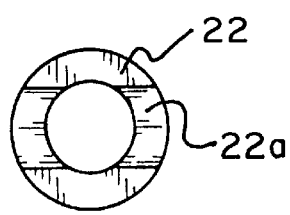
FIG. 11 is a cross-sectional view taken through line 11—11 of FIG. 10.
Figure 12:
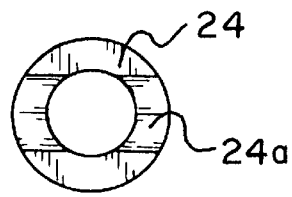
FIG. 12 is a cross-sectional view taken through line 12—12 of FIG. 10.

The handle bar portions 22 and 24 and insert 12 are keyed so as to prevent rotational movement thereof relative to each other. (See FIG. 10.) For example, right end 12a of insert 12 fits within recessed portion 22a of handle bar 22. Similarly, left end 12b of insert 12 fits within recessed portion 24a of handle bar 24. A parallel bar 32 that is clamped or otherwise secured to the handle bar portions 22 and 24 retains all of the parts in place. (See FIG. 8.)

Different size inserts may be placed between the two handle bar portions in order to extend the width thereof. For example, FIG. 4 shows a second insert 112 with a right end 112a and a left end 112b and a projection 114 having a right end 114a and a left end 114b. The projection 114 is placed within the insert 112 and is held in place via pin 120. The pin 120 is inserted into aperture 116 of the inert 112 and an aperture of the projection 114 as described above. Insert 112 may be approximately one inch in length. Insert 12, on the other hand may be approximately two inches in length. (See FIG. 3.)

The present invention may be embodied in other specific forms without departing from the spirit or essential attributes thereof and accordingly, reference should be made to the appended claims rather than to the foregoing specification as indicating the scope of the invention.

I claim:

1. An extendable handle bar assembly for a motorcycle comprising:

a right handle bar portion having a right proximal end and a right distal end;

a left handle bar portion having a left proximal end and a left distal end;

a first insert having a first predetermined length said first insert adapted to be positioned between said right and left proximal ends so as to expand the width of said handle bars during operation of the motorcycle, a second insert having a second predetermined length, said second length being greater than said first length and said second insert being adapted to be positioned between said right and left proximal ends so as to expand the width of said handle bars during operation of the motorcycle; and means for securing either said first insert or said second insert to said right and left proximal ends to create the handle bar assembly wherein each of said inserts is comprised of a generally cylindrically shaped tubular member having a right end and a left end; a generally cylindrically shaped rod member inserted through said tubular member and having a right end and a left end extending outwardly from said right and left ends of said tubular member, respectively; and means for securing said rod member and said tubular member together wherein said right end of said rod member extends within the proximal end of said right handle bar portion and said left end of said rod member extends within the proximal end of said left handle bar portion said means for securing said rod member and said tubular member together includes an aperture formed in both said tubular member and rod member and a pin inserted through said apertures in order to secure said members together.

2. The extendable handle bar assembly for a motorcycle of claim 1 further including means for retaining said rod member and said tubular member in place.

3. The extendable handle bars assembly for a motorcycle of claim 2 wherein said retaining means includes a bar secured to the handle bars of the motorcycle.

4. The extendable handle bar assembly for a motorcycle of claim 1 further including means for preventing rotational movement between either said first insert or said second insert and said left and right handle bar portions.

5. The extendable handle bar assembly for a motorcycle of claim 4 wherein said means for preventing rotational movement includes a recess in the proximal ends of each of said handle bar portions and a complimentary projection carried by either said first insert or said second insert.

6. An extendable handle bar assembly for a motorcycle comprising:

a right handle bar portion having a right proximal end and a right distal end;

a left handle bar portion having a left proximal end and a left distal end;

a first insert having a first predetermined length said first insert adapted to be positioned between said right and left proximal ends so as to expand the width of said handle bars during operation of the motorcycle;

a second insert having a second predetermined length, said second length being greater than said first length and said second insert being adapted to be positioned between said right and left proximal ends so as to expand the width of said handle bars during operation of the motorcycle;

means for securing either said first insert or said second insert to said right and left proximal ends to create the handle bar assembly; and means for preventing rotational movement between either said first insert or said second insert and said left and right handle bar portions, said means for preventing rotational movement includes a recess in the proximal ends of each of said handle bar portions and a complimentary projection carried by either said first insert or said second insert.

* * * * *